(12) United States Patent
Schneider et al.

(10) Patent No.: US 11,699,938 B2
(45) Date of Patent: Jul. 11, 2023

(54) GUIDING ELEMENT FOR AN ELECTRIC MOTOR

(71) Applicant: Minebea Mitsumi Inc., Nagano (JP)

(72) Inventors: Helmut Schneider, Zimmern-Floezlingen (DE); Fabian Sekinger, Eschbronn-Mariazell (DE)

(73) Assignee: Minebea Mitsumi, Inc., Nagano (JP)

( * ) Notice: Subject to any disclaimer, the term of this patent is extended or adjusted under 35 U.S.C. 154(b) by 85 days.

(21) Appl. No.: 17/388,288

(22) Filed: Jul. 29, 2021

(65) Prior Publication Data

US 2022/0037959 A1    Feb. 3, 2022

(30) Foreign Application Priority Data

Jul. 31, 2020    (DE) .................. 10 2020 120 250.4

(51) Int. Cl.
*H02K 7/12* (2006.01)
*H02K 11/215* (2016.01)
*H02K 7/116* (2006.01)

(52) U.S. Cl.
CPC .............. *H02K 7/12* (2013.01); *H02K 7/116* (2013.01); *H02K 11/215* (2016.01); *H02K 2211/03* (2013.01)

(58) Field of Classification Search
CPC ........ H02K 7/12; H02K 7/116; H02K 11/215; H02K 2211/03; H02K 5/04
See application file for complete search history.

(56) References Cited

U.S. PATENT DOCUMENTS

2018/0266530 A1*   9/2018   Alfano .............. H01R 13/5202
2019/0024786 A1    1/2019   Jeon et al.

FOREIGN PATENT DOCUMENTS

| DE | 10 2014 107 900 A1 | 12/2014 |
| EP | 2 485 367 A2 | 8/2012 |
| JP | 2015-23 761 A | 2/2015 |
| WO | 2018 060 630 A1 | 4/2018 |
| WO | 2019 068 784 A1 | 4/2019 |

* cited by examiner

*Primary Examiner* — Christopher M Koehler
*Assistant Examiner* — Viswanathan Subramanian
(74) *Attorney, Agent, or Firm* — Grossman, Tucker, Perreault & Pfleger PLLC; Steven J. Grossman

(57) ABSTRACT

The invention relates to a guiding element for use in an electric motor, an electric motor, and a method of installing a rotatable element in an electric motor. The guiding element comprises a guide for a rotatable element of the electric motor. The guide is adapted to radially guide the rotatable element relative to a rotary axis. The guiding element also comprises a centering device adapted to align and/or fix a sensor holding device in the electric motor relative to the guiding element. Moreover, the guiding element comprises a fixing device adapted to fix the guiding element to a housing of the electric motor.

18 Claims, 9 Drawing Sheets

GUIDING ELEMENT FOR AN ELECTRIC MOTOR

FIELD OF THE INVENTION

The disclosure relates to a guiding element for use in an electric motor, an electric motor and a method of installing a rotatable element in an electric motor.

BACKGROUND OF THE INVENTION

Small electric motors, such as brushless DC motors (BLDC motors) are used amongst others in the automotive field and in the field of automation, for example as a servo motor, fan motor or drives for actuators, such as flap actuators or valves, such as needle valves. For control and monitoring, such electric motors can be equipped with sensors to determine motor parameters, such as the rotary position, the rotor speed or the position of an actuator coupled with the motor.

An electric motor can include, for example, a Hall sensor adapted to measure a strength and/or a direction of a magnetic field. A magnet can be mounted on a rotatable element of the electric motor, for example on an output gear. The Hall sensor can be arranged in the vicinity of the output gear to measure the magnetic field generated by the magnet. If the output gear is moved, the magnetic field changes at the location of the sensor. The measured magnetic field can thus be used to determine the rotary angle position of the output gear and, as the case may be, the position of an actuator coupled therewith.

For supporting the rotatable element, the electric motor can comprise a guide, for example in contact with a bearing surface of the rotatable element to radially and/or axially guide the latter relative to a rotary axis. Due to the compact structure of small electric motors, there is often only limited space within the housing of the electric motor.

This can make it difficult to accommodate the guide and the sensor together in the direct vicinity of the rotatable element.

OVERVIEW

It is thus an object of the present disclosure to provide a guiding element for a rotatable component in an electric motor, which enables the arrangement of a sensor in the vicinity of the rotatable element and at the same time ensures stable guiding of the rotatable component.

The object is achieved according to the present disclosure by a guiding element, an electric motor comprising a rotatably support element, a guiding element and a sensor holder, and a method of installing a rotatable element in an electric motor.

A guiding element for use in an electric motor is provided, comprising a guide for a rotatable element of the electric motor, a centering device, and a fixing device. The guide is adapted to radially guide the rotatable element relative to a rotary axis. In particular, the guide can be arranged on a first end face of the guiding element. The centering device is adapted to fix a sensor holding device in the electric motor relative to the guiding element, wherein the centering device may e.g. be arranged on a second end face of the guiding element opposite the first end face. The fixing device is adapted to fix the guiding element to a housing of the electric motor.

The guiding element can comprise a main body having surfaces forming the first and the second end face. In some examples the first and the second end face are parallel to each other. The guide can be integrally formed with the main body, for example by means of an injection molding method, by milling and/or by means of an additive manufacturing method. In other examples, the guide can be fixed on the main body, for example adhesively glued, welded or screwed to the main body. In some examples the guiding element comprises one or more cantilever arms or regions extending away from the main body of the guiding element, for example for fixing the guiding element to the housing of the electric motor, as described below. Furthermore, the guiding element can be adapted to axially guide, or support the rotatable element relative to the rotary axis.

The guide can comprise one or more contact surfaces adapted to come into contact with the rotatable element to radially guide the rotatable element relative to the rotary axis. The contact surface can limit or prevent movement of the rotatable element perpendicular to the rotary axis, i.e., in a radial direction. The contact surface can extend, for example, parallel to the rotary axis along a bearing surface of the rotatable element. The contact surface can also extend along a circumferential direction wholly or partially about the rotary axis. In some examples, the guide can comprise a plurality of contact surfaces, which are arranged about the rotary axis in the circumferential direction. In some examples, the guide can also be adapted to axially guide the rotatable element relative to the rotary axis, for example to limit or prevent a movement of the rotatable element along the rotary axis. For this purpose, the guide can comprise a contact surface which extends in a radial and/or azimuthal direction, for example perpendicular to the rotary axis. The rotatable element can be a gear, for example, in particular an output gear of the electric motor, or a shaft.

In an example, the guide comprises a cylindrical contact surface adapted to come into contact with the rotatable element. The cylindrical contact surface extends fully about the rotary axis in the circumferential direction, thus achieving stable and secure guiding of the rotatable element. In other examples, the guide can comprise a plurality of contact surfaces which are each azimuthal segments of a cylinder, i.e., the cross-sectional surfaces of the contact surfaces can each extend along a circular arc.

In some examples the guide can protrude from the first end face of the guiding element. This can enlarge the contact surface and thus ensure secure guiding of the rotatable element. Alternatively or additionally, the guide can also extend from the first end face into the guiding element. The guide can comprise, for example, a recess or an opening extending from the first end face along the rotary axis into the guiding element.

In an example, the guiding element comprises an opening extending along the rotary axis through the guiding element from the first end face to the second end face. The opening can be configured, for example, so that a sensor can be wholly or partially arranged in the opening, for example in such a manner that the rotary axis extends through the sensor. This enables arrangement of the sensor in the direct vicinity of the rotatable element. In some examples, the opening or a part thereof can simultaneously be part of the guide, and can be adapted to at least partially receive the rotatable element. A sidewall surface of the opening can form, for example, a contact surface of the guide.

The centering device is adapted to fix a sensor holding device of the electric motor relative to the guiding element. In an example, the sensor holding device comprises a printed circuit board adapted to receive the sensor in a sensor holder, for example on a soldering point provided therefore. The centering device can be used to define the position of the sensor relative to the rotary axis and to suppress a movement of the sensor relative to the rotary axis, for example due to vibrations. The centering device is arranged on the second end face opposite the first end face of the guiding element and thus enables arrangement of the guiding element between the rotatable element and the sensor holding device.

The centering device can comprise, for example, a fixing element adapted to engage a counterpart on the sensor holding device to fix the sensor holding device relative to the guiding element. In one example, the centering device comprises one or more snap hooks adapted to embrace a circumferential surface of the sensor holding device, for example a circumferential surface of the printed circuit board. In another example, the centering device comprises a detent pin, adapted to engage an opening in the sensor holding device, for example in an opening extending through the printed circuit board. In another example, the centering device comprises a press-fit pin adapted to be pressed into an opening or into a recess in the sensor holding device, for example into an opening or recess in the printed circuit board. Alternatively or additionally, the centering device can be a screw and/or a thread. In some examples the centering device comprises a recess or opening adapted to receive a counterpart of the sensor holding device, such as a detent pin, a press-fit pin or a screw.

The fixing device is adapted to fix the guiding element to a housing of the electric motor, for example to an end face and/or on a bottom portion of the housing. The fixing device can comprise, for example, one or more openings or recesses, which are respectively adapted to receive a fixing element to fix the guiding element on the housing of the electric motor. The fixing element can be, for example, a screw, a press-fit pin, a detent pin or a snap hook and, in some examples, can be part of the housing or fixedly connected thereto. In some examples, the fixing device itself comprises a fixing element, adapted to engage with a counterpart on the housing to fix the guiding element to the housing.

In an example, the fixing device comprises at least three attachment points, which are respectively adapted to be fixed to the housing. Each of the attachment points can comprise, for example, an opening or a recess and/or a fixing element. In some examples, at least one of the attachment points, in one example all of the attachment points, is situated on a cantilever arm extending away from the main body of the guiding element. This can help to reduce the space requirement of the guiding element and facilitate arrangement of the guiding element in the housing of the electric motor.

Furthermore, an electric motor is provided comprising a rotatably supported element, a guiding element and a sensor holder. The sensor holder is adapted to receive a sensor so that a rotary axis of the rotatably supported element extends through the sensor. The guiding element is adapted to radially guide the rotatably supported element relative to the rotary axis. The guiding element is arranged between the rotatably supported element and the sensor holder, wherein the rotatably supported element is situated facing a first end face of the guiding element, and the sensor holder is situated facing a second end face of the guiding element. The electric motor can be, in particular, an electronically commutated electric motor, for example a stepper motor or a brushless DC motor. In other examples, the electric motor can be configured as a DC motor.

An arrangement of the sensor on the rotary axis, i.e., coaxial with the rotary axis, can be advantageous, for example, for determining the position of the rotatably supported element, for example to obtain a measuring signal that is anti-symmetrical with respect to the rotary angle position. Also, such an arrangement can enable a reduction of the distance between the sensor and an element detected by the sensor, such as a magnet, and thus achieve a stronger measuring signal.

The sensor holder can comprise, for example, a fixing element adapted to engage a counterpart on the sensor to fix the sensor on the sensor holder. In another example, the sensor holder can be adapted to be adhesively glued and/or soldered to the sensor. The sensor holder can comprise a support surface on which the sensor can be arranged. In one example, the sensor holder comprises a recess or opening, in which the sensor can be arranged. In an example, the sensor holder is adapted to provide an electric connection to the sensor. The sensor holder can comprise, for example, one or more solder lands or soldering pads.

In some examples the electric motor comprises a housing, wherein the guiding element is fixed to the housing. In an example the guiding element is fixed on a sidewall of the housing extending parallel to the rotary axis. The sidewall can comprise, for example, a bearing surface, for example a protrusion or a supporting rib, on which the guiding element rests. In other examples, the guiding element can be fixed, for example, on a bottom portion of the housing or on a support element connected with the bottom surface. The guiding element can be fixed to the housing by means of an attachment element. Alternatively or additionally, the guiding element can be adhesively glued, welded and/or hot caulked to the housing.

The guiding element can comprise one or more contact surfaces in contact with the rotatably supported element, for example, with one or more bearing surfaces of the rotatably supported element. A lubricant may be introduced between the contact surface and the rotatably supported element to facilitate rotary movement of the rotatably supported element relative to the contact surface. The contact surface can be formed, for example, as described above. In an example, the guiding element comprises a cylindrical contact surface in contact with a bearing surface of the rotatably supported element, wherein the bearing surface is, for example, annular or also cylindrical. The bearing surface can be, for example, the outer circumferential surface of the shaft or a shank. In some examples, the rotatably supported element, which can be, for example, a gear, comprises an end-face annular recess extending about the rotary axis in the circumferential direction. The guiding element can extend into the annular recess, for example, parallel to the rotary axis, and can be in contact with a circumferential surface of the annular recess, for example, with a radially inner or outer circumferential surface of the recess.

The guiding element is adapted to radially guide the rotatably supported element relative to the rotary axis, for example as described above. In some examples, the guiding element can also be adapted to axially guide the rotatably supported element relative to the rotary axis. The guiding element can comprise, for example, a first contact surface extending parallel to the rotary axis, and a second contact surface extending perpendicular to the rotary axis. The first and second contact surfaces can each be in contact with an associated bearing surface of the rotatably supported element.

In an example, the rotatably supported element is a gear, in particular an output gear, comprising an output shaft on the side facing away from the sensor holder, adapted to be mechanically coupled with an actuator. For this purpose, the output shaft can have, for example, a suitable engagement profile. The output shaft can be integrally formed with the output gear, and can extend, for example, from an end face of the output gear facing away from the sensor holder and the guiding element along the rotary axis. Furthermore, the output shaft can also be formed as a hollow shaft, wherein the hollow shaft is open on the side facing away from the output gear. The output gear can be mechanically coupled with a rotor of the electric motor, for example via a transmission, as described below.

The sensor holder can be part of a sensor holding device of the electric motor, wherein the sensor holding device can additionally comprise a connecting element which mechanically and/or electrically connects the sensor holder to the housing of the electric motor or other components of the electric motor. The sensor holder may be arranged, for example, on a printed circuit board. The sensor holder can be integrally formed with the printed circuit board or can be attached thereto. In one example, the sensor holder comprises one or more solder lands or soldering pads, respectively adapted to be soldered to the sensor and to connect the sensor to a conductor path on the printed circuit board.

The guiding element may be situated between the sensor holding device and the rotatably supported element, for example between the printed circuit board and the rotatably supported element. The printed circuit board can be arranged, for example, facing or adjacent to the second end face of the guiding element and thus be situated on a side of the guiding element facing away from the rotatably supported element. The printed circuit board can extend, for example, parallel to the second end face of the guiding element. The sensor holder can be adapted to receive the sensor in such a way that the sensor is arranged in or adjacent to an opening extending along the rotary axis through the guiding element. In some examples, the sensor holder extends from the printed circuit board in the direction toward the guiding element, in one example into the opening in the guiding element.

In some examples, the printed circuit board is a motherboard of the electric motor on which a control unit of the electric motor is arranged. The control unit can be adapted, for example, to determine a position of the rotatably supported element based on a measuring signal provided by the sensor. The control unit can also be adapted to provide and/or to control electric drive signals for a motor unit of the electric motor. In one example, all electronic components of the electric motor are arranged on the motherboard.

The guiding element can comprise a centering device adapted to fix the printed circuit board relative to the guiding element. The centering device can comprise one or more fixing elements, which are respectively adapted to engage a counterpart on the printed circuit board, for example in a way similar to the above-described centering device. In some examples, the printed circuit board can comprise a region or arm extending from a main body of the printed circuit board in the direction toward the rotary axis of the rotatably supported element. The sensor holder can be arranged on this region, wherein the centering device can be adapted, in particular, to fix this region of the printed circuit board relative to the guiding element, for example to prevent movement of the sensor holder relative to the rotatably supported element. In other examples, the guiding element may not comprise a centering device.

The rotatably supported element can be mechanically coupled to a rotor of the electric motor via a transmission, for example via a speed reduction transmission. The transmission can be, for example, a spur gear and/or a worm gear.

The transmission elements can be arranged, for example, stepwise or in a non-parallel, non-intersecting arrangement. At least one transmission element can be arranged on a side of the printed circuit board facing away from the rotatably supported element, i.e., so that the printed circuit board is situated in a plane between the transmission element and the rotatably supported element. In one example, the transmission is arranged entirely on the side of the printed circuit board facing away from the rotatably supported element, i.e., all transmission elements can be situated on the side of the printed circuit board facing away from the rotatably supported element. In other examples, the transmission is arranged entirely on a side of the printed circuit board facing the rotatably supported element. The transmission may not be in contact with the printed circuit board. The printed circuit board can comprise one or more openings or recesses, in each of which an axle or shaft can be arranged for a transmission element, for example to connect the corresponding transmission element to the housing on the side of the printed circuit board facing away from the transmission element. In one example, at least one transmission element is situated in the same plane as the printed circuit board, for example in a recess in the printed circuit board.

In an example, the rotatably supported element comprises a magnet. The magnet can be arranged on the rotatably supported element in such a manner, for example, that a surface of the magnet faces in the direction toward the sensor holder. In one example, the magnet is arranged on an end face of the rotatably supported element, for example in a recess on the end face of the rotatably supported element. The magnet may be arranged on a rotary axis of the rotatable element, wherein the rotary axis extends through the magnet. The rotary axis extends through the magnet body itself, i.e., not through an opening in the magnet body, as is the case, for example, with annular positioning magnets. In one example, the magnet is a continuous disc, comprising two opposite continuous end faces and is magnetized, for example, in a diametric fashion.

In some examples, a sensor can be arranged in the sensor holder, in particular a magnetic field sensor adapted to measure a magnetic field generated by the magnet. Both the magnet and the magnetic field sensor may be arranged on the rotary axis so that the rotary axis extends through the magnet and the magnetic field sensor. The magnetic field sensor can be, for example, a Hall sensor, for example a two-dimensional or three-dimensional Hall sensor adapted to measure the strength of the magnetic field generated by the magnet along two or three axes, respectively. Alternatively, the sensor can also be formed as an inductive or capacitive sensor. With an inductive sensor, the rotatable element comprises an electrically conductive target asymmetrically formed with respect to the rotary axis. In this case, at least one coil can be arranged on the sensor holder which can measure a change in an effective inductivity as a function of the rotary angle position of the rotatable element, or the target. In the case of a capacitive sensor, the rotatable element can also comprise an electrically conductive element also asymmetrically formed in relation to the rotary axis. For example, two electrodes can be arranged on the sensor holder, wherein the capacitance created by the two electrodes changes as a function of the rotary angle position of the electrically conductive element, or the rotatable element, to enable measuring of the rotary angle position.

In some examples, the guiding element in the electric motor corresponds to one of the above-described examples of the guiding element according to the present disclosure. In particular, the guiding element can comprise a guide arranged on the first end face of the guiding element. Furthermore, in some examples, the guiding element can comprise a centering device adapted to fix a sensor holding device, comprising the sensor holder, in the electric motor relative to the guiding element. The centering device can be arranged, in particular, on the second end face of the guiding element opposite the first end face. Also, the guiding element can comprise a fixing device, as described above.

The disclosure also provides a method of installing a rotatable element in an electric motor. The method comprises (1) arranging the rotatable element in a bearing in a housing of the electric motor, wherein the bearing is adapted to rotatably support the rotatable element about a rotary axis; (2) arranging a guiding element on a side of the rotatable element facing away from the bearing, wherein the guiding element is in contact with a bearing surface of the rotatable element and is adapted to radially guide the rotatable element relative to the rotary axis; and (3) arranging a sensor in a sensor holder so that the rotary axis of the rotatable element extends through the sensor, wherein the guiding element is situated between the sensor holder and the rotatable element. The above numbering of the steps is only intended to provide clarity and does not imply a temporal order of execution. As far as technically possible, the steps of the method can be in any particular order and, in particular, can also be at least in part carried out simultaneously.

The electric motor and/or the guiding element can correspond, for example, to one of the above-described examples. The rotatable element can be, for example, a shaft or a gear, in particular an output gear of the electric motor. In some examples, the rotatable element can comprise a magnet or the method can comprise mounting or fixing a magnet on the rotatable element, for example, by means of adhesively gluing or welding. The magnet may be arranged on the rotatable element in such a way that the rotary axis of the rotatably supported element extends through the magnet.

The bearing can comprise, a plain bearing or a ball bearing, and can be arranged, for example, in or on a sidewall of the housing, for example a bottom portion of the housing. In some examples, the bearing can comprise an opening in the housing. Arranging the rotatable element in the bearing can comprise inserting part of the rotatable element or an element connected to the rotatable element, for example a shank or a shaft, in particular an output shaft, into the opening. In some examples, the bearing can be integrally formed with the housing. In an example, the rotatable element is arranged in the bearing prior to the arrangement of the guiding element. Arranging the rotatable element can further comprise mechanically coupling the rotatable element with other components of the electric motor, for example with a transmission of the electric motor.

The guiding element is arranged in such a way that the rotatable element is situated between the bearing and the guiding element. This enables stable guiding of the rotatable element at two positions, for example, at two opposite ends of the rotatable element, by means of the bearing and the guiding element. The guiding element can comprise, for example, a cylindrical contact surface in contact with the bearing surface of the rotatable element. In one example the guiding element has an opening extending through the guiding element, and the bearing surface is brought into contact with a circumferential surface of the opening. In an example, the guiding element is adapted to radially and axially guide the rotatable element relative to the rotary axis. The guiding element can include, for example, two contact surfaces as described above, each able to be brought into contact with a corresponding bearing surface of the rotatable element. One contact and bearing surface each can extend, for example, parallel or perpendicular to the rotary axis.

Arranging the guiding element can comprise fixing the guiding element to the housing, for example, by means of a fixing device and/or a fixing element as described above. The guiding element can be, for example, hot caulked, adhesively glued, screwed and/or welded to the housing, for example, by means of ultrasonic welding. The guiding element can be fixed to the housing, for example, at two, three or more attachment points.

The sensor is arranged in the sensor holder in such a manner that the rotary axis of the rotatable element extends through the sensor. In an example the sensor is arranged in or facing an opening in the guiding element, wherein the opening may e.g. extend through the guiding element along the rotary axis of the rotatable element. The sensor can be fixed to the sensor holder, for example adhesively glued, soldered and/or can be connected by means of a fixing element. The sensor holder can be part of a sensor holding device. In an example, the sensor holding device comprises a printed circuit board, wherein the sensor holder is arranged and fixed on the printed circuit board. In one example, the sensor holder is or comprises a number of solder lands or soldering pads.

Arranging the sensor can comprise arranging the sensor holder device in the electric motor, for example by fixing it to the housing of the electric motor, wherein the sensor can be fixed to the sensor holding device before or after arranging the sensor holding device. In some examples the method also comprises fixing of the sensor holding device relative to the guiding element, for example, by means of a centering device as described above.

In an example of the method according to the present disclosure, the rotatable element is first arranged in the bearing, then the guiding element is arranged on the side of the rotatable element facing away from the bearing and thereafter the sensor is arranged in the sensor holder on the rotary axis.

SHORT DESCRIPTION OF THE DRAWINGS

Examples of the present disclosure will be described in the following in more detail with reference to the accompanying drawings. In the schematic representation of the figures:

FIG. 1a shows a cross-sectional view of a guiding element for use in an electric motor according to an example;

FIG. 1b shows a plan view of the guiding element of FIG. 1a;

FIG. 2a shows a perspective view of a guiding element according to a further example;

FIG. 2b shows a perspective view of a guiding element according to a further example;

FIG. 3a shows an exploded view of an electric motor comprising a guiding element with a centering device according to an example;

FIG. 3b shows a plan view of the electric motor of FIG. 3a;

FIG. 3c shows a perspective view of the electric motor of FIG. 3a;

FIG. 4a shows an exploded view of an electric motor comprising a guiding element without centering device according to an example;

FIG. 4b shows a plan view of the electric motor of FIG. 4a;

FIG. 4c shows a perspective view of the electric motor of FIG. 4a;

FIG. 5a shows an exploded view of a further example of an electric motor comprising a guiding element without centering device according to an example;

FIG. 5b shows a diagonal view of the electric motor of FIG. 5a with the housing open without an output gear;

FIG. 5c shows a perspective view of the transmission and the brushless DC motor of the electric motor of FIG. 5a; and FIG. 6 shows a flow diagram of a method of installing a rotatable element in an electric motor according to an example.

DESCRIPTION OF THE FIGURES

FIG. 1a shows the guiding element in cross-section, and FIG. 1b shows a plan view along the rotary axis 106, wherein, in FIG. 1b, the sensor holding device 112 comprising the sensor 114 is not shown for clarity. The guiding element 100 can be used, for example, in one of the electric motors 300, 400 and 450 described below.

Figure 1A:
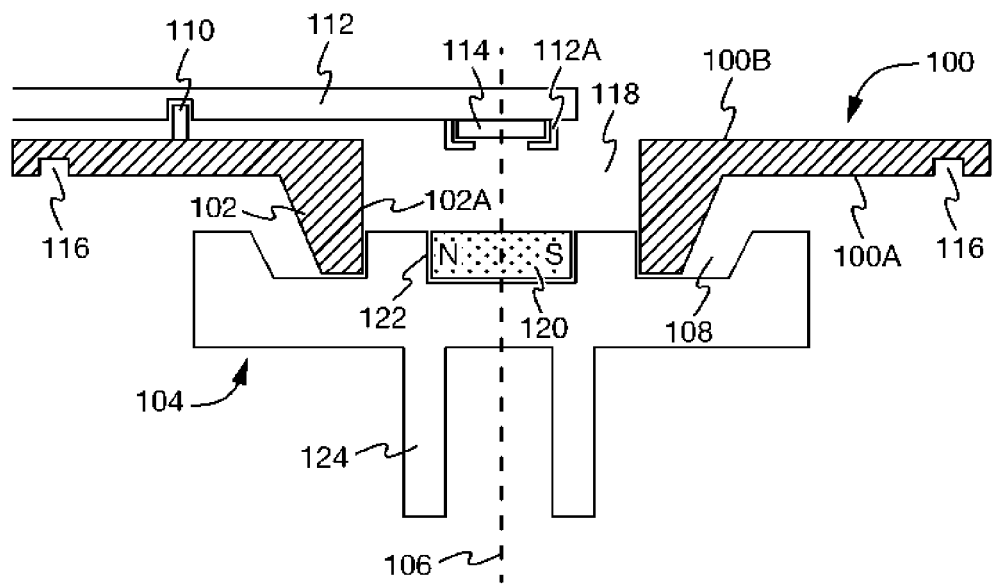
FIGS. 1a and 1b show a guiding element 100 for use in an electric motor (not shown) according to an example.
Figure 1B:
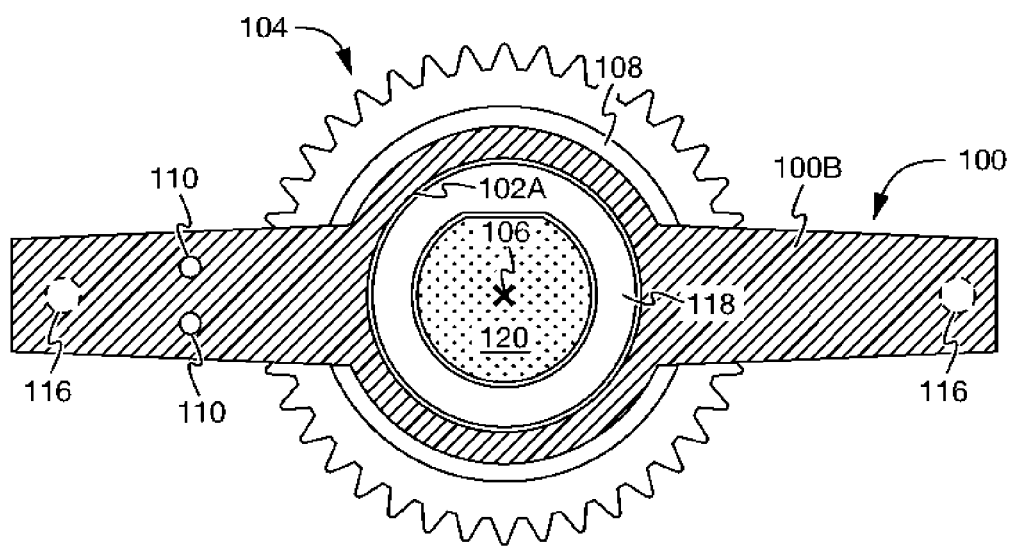

The guiding element 100 comprises a guide 102 for a rotatable element 104 of the electric motor. In the example of FIG. 1a, 1b the rotatable element 104 is a gear, for example an output gear as described below, which will be designated as gear 104 in the following. In other examples the rotatable element 104 can also be another rotatably supported element in the electric motor, for example a shaft or a shank. The gear 104 can have, for example, a diameter of between 1 cm and 10 cm.

The guide 102 is arranged on a first end face 100A of the guiding element 100. The guide 102 is adapted to radially guide the gear 104 relative to a rotary axis 106. The guide 102 can be adapted, for example, to limit or prevent movement of the gear 104 perpendicular to the rotary axis 106. In the example of FIG. 1a, 1b, the guide 102 comprises a cylindrical contact surface 102A fully extending about the rotary axis 106 in the circumferential direction. The contact surface 102A is in contact with a correspondingly formed bearing surface of the gear 104, wherein a lubricant may be introduced between the contact surface 102A and the bearing surface. An internal diameter of the contact surface 102A can be, for example, between 2 mm and 1 cm.

In the example of FIG. 1a, the guide 102 protrudes from the first end face 100A of the guiding element 100. The gear 104 has an annular recess 108 on an end face, extending about the rotary axis 106. The guide 102 is arranged in the recess 108 so that the contact surface 102A is in contact with an inner circumferential surface of the recess 108 to radially guide the gear 104. The contact surface 102A can extend, for example, parallel to the rotary axis 106 into the recess 108. Furthermore, a second contact surface of the guide 102 is in contact with a bottom surface of the recess 108 to axially guide the gear 104. The bottom surface of the recess 108 can extend, for example, perpendicular to the rotary axis 106.

The guiding element 100 can be made, for example, of metal and/or a plastic material, in particular a thermoplastic material. The material of the contact surface 102A may be adapted to a material of the gear 104 in order to enable low-friction guiding of the gear 104. The gear 104 can also be of metal, for example steel or aluminum, and/or a hard plastic, for example a glass fiber-reinforced plastic. In one example, the gear 104 is of Polyphthalamide (PPA), for example glass fiber-reinforced PPA, and the guiding element 100 is of Polybutylene terephthalate (PBT).

The guiding element 100 further comprises a centering device 110 adapted to fix a sensor holding device 112 within the electric motor relative to the guiding element 100, for example to fix a position of the sensor holding device 112 or a sensor 114 arranged therein relative to the rotary axis 106. The centering device 110 is arranged on a second end face 100B of the guiding element 100, wherein the second end face 100B is opposite the first end face 100A. In some examples, the second end face 100B can extend parallel to the first end face 100A as shown in FIG. 1a. By arranging the guide 102 and the centering device 110 on opposite sides of the guiding element 100 the guiding element 100 can be arranged in an electric motor between the gear 104 and the sensor holding device 112, for example as explained below with reference to FIGS. 3 and 4. To receive the sensor 114 the sensor holding device 112 can comprise a sensor holder 112A, wherein the sensor holder 112A can have one or more fixing elements, such as snap hooks and/or one or more adhesive or soldering surfaces for fixing the sensor 114. In some examples, the sensor holding device 112 can comprise a printed circuit board comprising a sensor holder 112A, wherein the sensor holder can include, for example, one or more solder lands or soldering pads. To fix the sensor holding device 112 the centering device 110 can comprise a fixing element adapted to interlock with a counterpart on the sensor holding device 112, such as a pin which in FIG. 1a is shown to be arranged in a recess in the sensor holding device 112 or as described in the following with reference to FIG. 2a.

The guiding element 100 also comprises a fixing device 116 adapted to fix the guiding element 100 to a housing (not shown) of the electric motor. The fixing device 116 can comprise, for example, one or more recesses 116 in the first and/or second end face 100A, 100B. The recesses 116 are each adapted to receive a fixing element such as a protrusion, a detent nose or a press-fit pin in order to attach the guiding element 100 to the housing.

In the example of FIGS. 1a, 1b, the guiding element 100 has an opening 118 extending through the guiding element 100 along the rotary axis 106. The opening 118 can be formed, for example, in such a manner that the sensor 114, itself received within the sensor holding device 112, can be arranged therein. This enables the sensor 114 to be mounted in the direct vicinity of the gear 104. The sensor holder 112A can extend, for example, from the sensor holding device 112 into the opening 118. A circumferential surface of the opening 118 additionally forms the contact surface 102A of the guide 102, i.e., the opening 118 is simultaneously part of the guide 102. The opening 118 can have a uniform cross-section along its entire length as shown in FIG. 1a. In other examples, the cross-section of the opening 118 can vary along its length. For example, the opening 118 can have a first section and a second section, wherein the first section has a larger or smaller diameter than the second section. The first section can be part of the guide 102 and can be adapted to receive a part of the gear 104, for example a guiding shaft. The second section can extend from the first section to the second end face 100B and may be adapted to receive the sensor 114.

In the example shown in FIGS. 1a, 1b, a disc-shaped magnet 120 is arranged on the gear 104, wherein the rotary axis 106 extends through the magnet 120. The magnet 120 is diametrically magnetized, i.e., the magnet poles are in a plane parallel to the end faces of the disc, e.g. in a plane perpendicular to the rotary axis 106. The magnet 120 is in a recess 122 on the end face of the gear 104, which is separated from the annular recess 108 by a circumferential web. In one example, a surface of the magnet 120 is flush with the circumferential web, i.e., the magnet does not protrude from the recess 122. The magnet 120 can be a rare earth magnet, for example, in particular a neodymium iron boron magnet (NdFeB) or a samarium cobalt (SmCo) based magnet, for example with iron, copper and zirconium as additional alloying elements ($Sm_2Co_{17}$).

The gear 104 can be, for example, an output gear of the electric motor which is mechanically coupled with a rotor of the electric motor via a transmission (not shown), such as it is described for the electric motors 300 and 400. The gear 104 can comprise an output shaft 124 or can be rigidly coupled therewith. The output shaft 124 can extend, for example, from an end face of the gear 104 facing away from the magnet 120 along the rotary axis 106. The output shaft 124 can be formed, for example, as a hollow shaft and can have an engagement profile on its inside and/or outside to mechanically couple the gear 104 with an actuator (not shown).

Figure 2A:
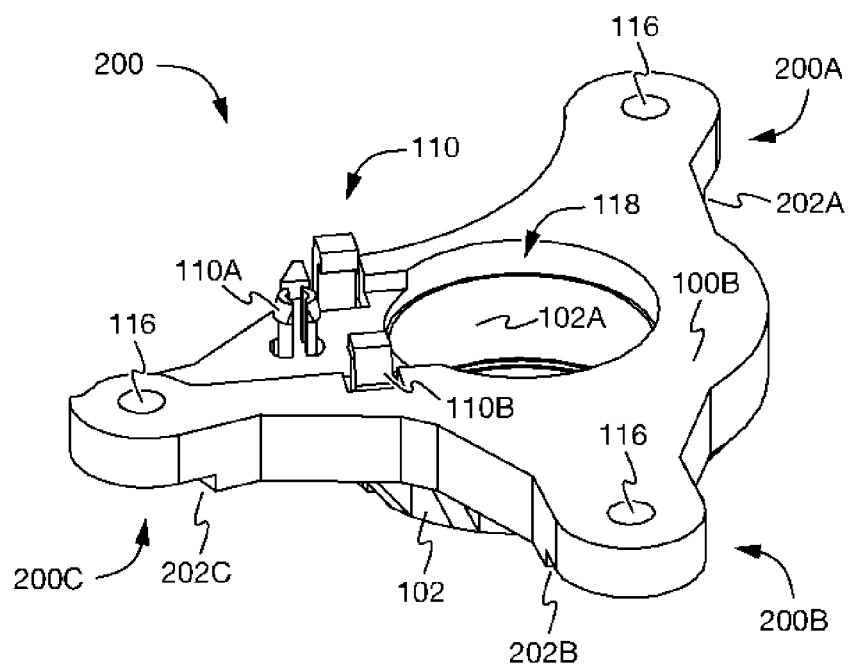

FIG. 2a shows a perspective view of a guiding element 200 according to a further example. The guiding element 200 is similar to the guiding element 100 and also comprises a guide 102 for a rotatable element of an electric motor (not shown), a centering device 110 and a fixing device 116.

The centering device 110 of the guiding element 200 is adapted to fix a printed circuit board (not shown) relative to the guiding element 200. The printed circuit board is adapted to receive a sensor and is therefore an example of a sensor holding device. The centering device 110 comprises a plurality of fixing elements 110A, 110B arranged on the second end face 100B of the guiding element 200 and each adapted to engage a counterpart on the printed circuit board to fix the printed circuit board relative to the guiding element 200. The centering device 110 comprises a detent pin 110A adapted to extend through an opening in the printed circuit board and to snap engage therewith. The centering device 110 further comprises two snap hooks 110B adapted to embrace two opposite circumferential surfaces of the printed circuit board. Alternatively or additionally, the centering device 110 can comprise further fixing elements, such as a press-fit pin, a screw and/or a thread. In some examples, the centering device either comprises the detent pin 110A or the snap hooks 110B.

The guiding element 200 has a main body, which comprises the guide 102 and surrounds a through opening 118. Three cantilever arms or regions 200A, 200B, 200C extend away from the main body, on each of which there is an attachment point of the fixing device 116. The attachment points are adapted to be attached to the housing of an electric motor, as described for example below with reference to FIG. 3. The fixing device 116 can have an opening, for example, as shown in FIG. 2a on each of the attachment points, extending through the guiding element 200 and adapted to receive an attachment element such as a pin, a screw or a rivet. In the example shown, a centering collar 202A, 202B, 202C is formed on each of the three cantilever arms 200A, 200B and 200C. The centering collars 202A-202C are each formed as a step in the cantilever arms on their side adjacent to the housing. The distal ends of the cantilever arms 200A-200C thus have a reduced thickness. The centering collars 202A-202C thus serve to position and center the fixing device 116.

Figure 2B:
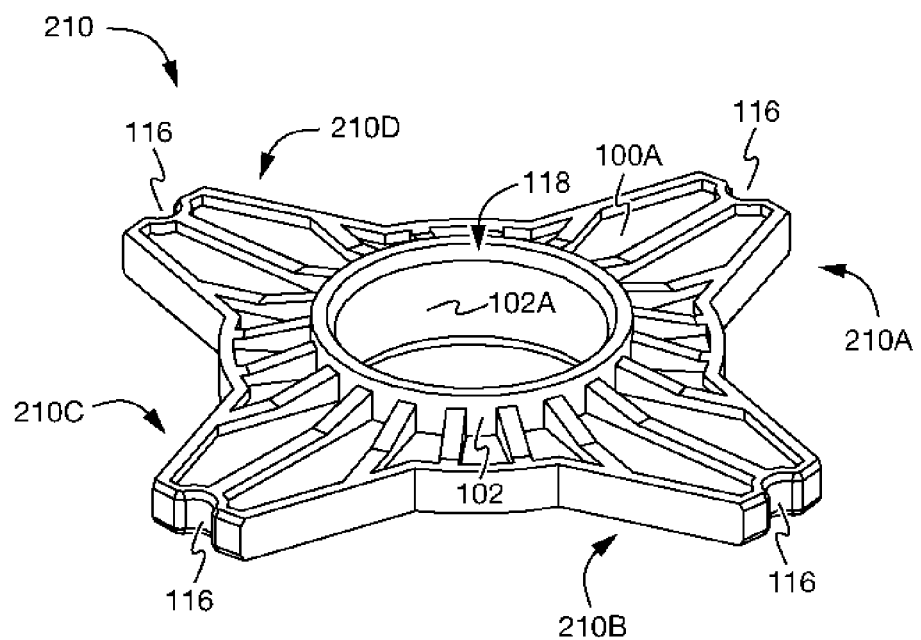

FIG. 2b shows a perspective view of a guiding element 210 according to a further example. The guiding element 210 is similar to the guiding elements 100 and 200 and also comprises a guide 102 for a rotatable element of an electric motor (not shown), a centering device 110 (not shown) and a fixing device 116.

The guide 102 comprises a hollow cylinder extending through the guiding element 210 and surrounding the opening 118. The hollow cylinder protrudes from the first end face 100A of the guiding element 210, wherein a plurality of ribs is arranged on the first end face 100A extending towards the outside from an external circumferential surface of the hollow cylinder. In some examples the guiding element 210 can be mirror-symmetrically formed. For example, a plurality of ribs can also be arranged on the second end face 100B not shown in FIG. 2b, on which the centering device 110 is situated, and the hollow cylinder can protrude from the second end face 100B. In one example, the guiding element 210 may not surround the hollow cylinder and the guide 102 may only be formed through the opening 118 between the first and the second end faces 100A, 100B.

The guiding element 210 has four cantilever arms 210A, 210B, 210C, 210D, which extend away from a main body of the guiding element 210 surrounding the opening 118. At their ends facing away from the main body, the cantilever arms 210A, 210B, 210C, 210D have recesses which together form the fixing device 116 and are adapted, for example, to receive a corresponding protrusion or a corresponding fixing nose on the sidewall of a housing of the electric motor, as described, for example, below with reference to FIG. 4.

Figure 3A:
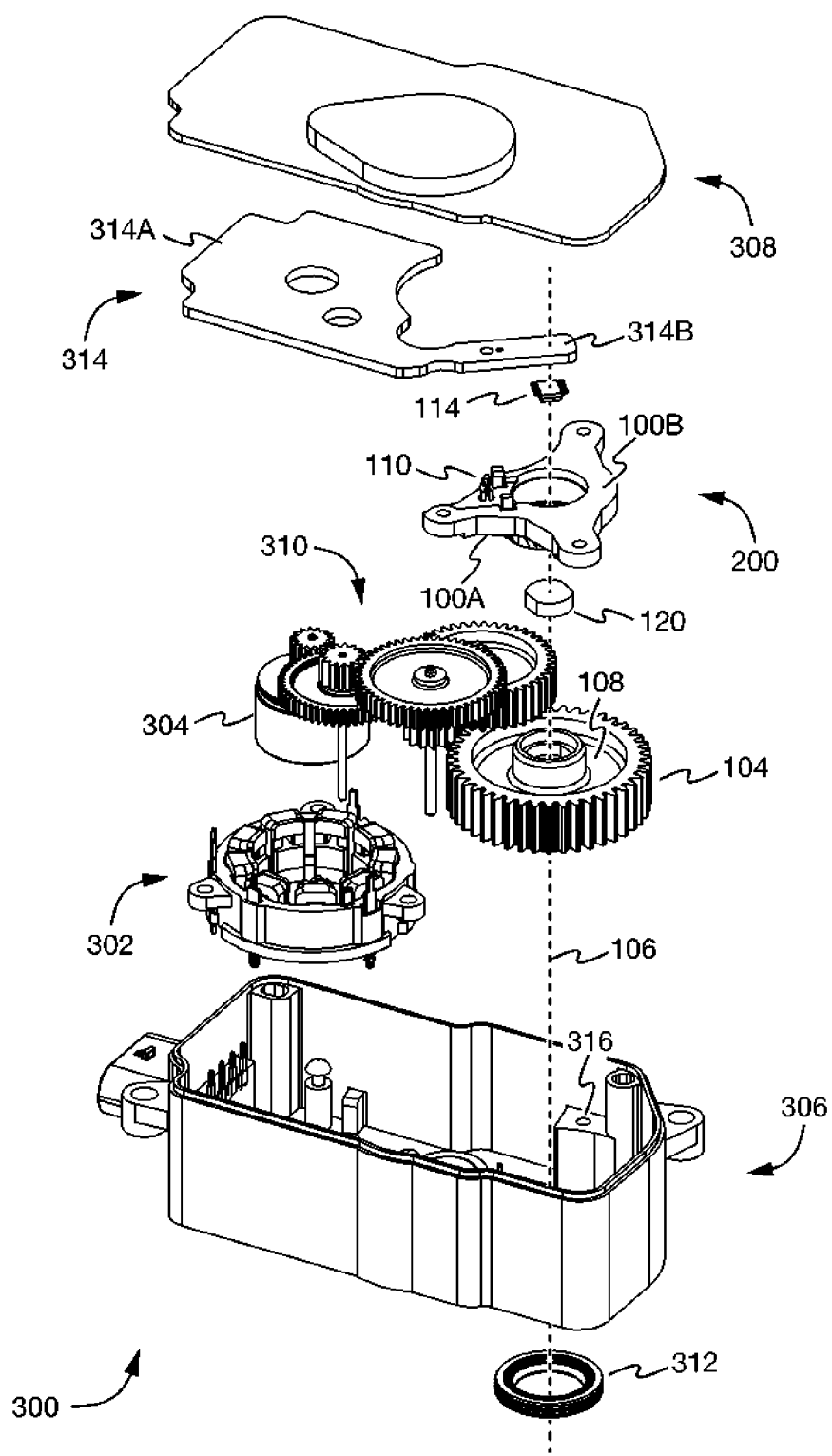
Figure 3B:
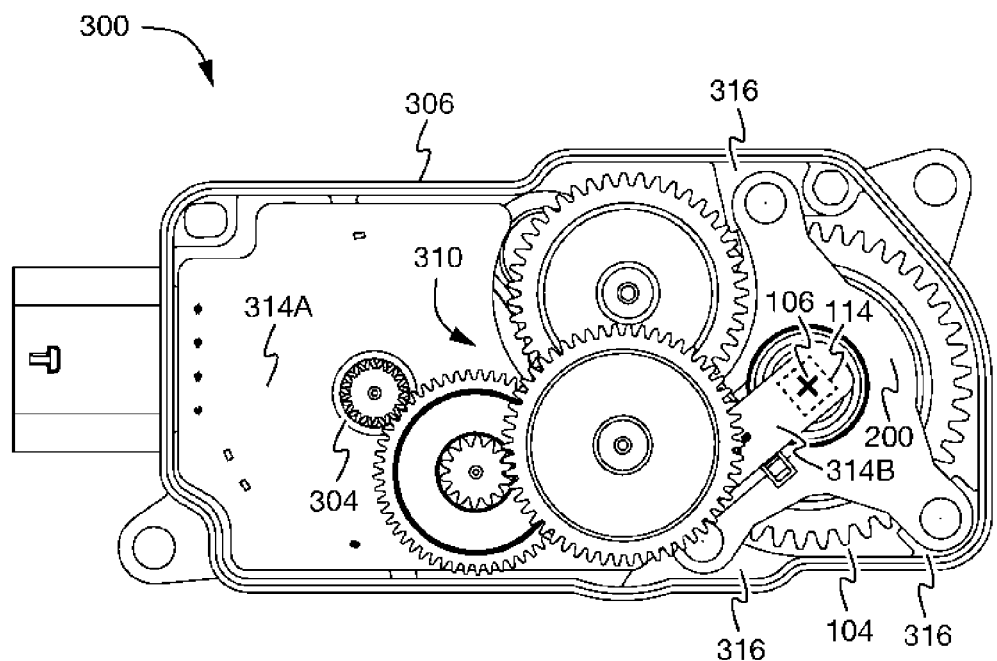
Figure 3C:
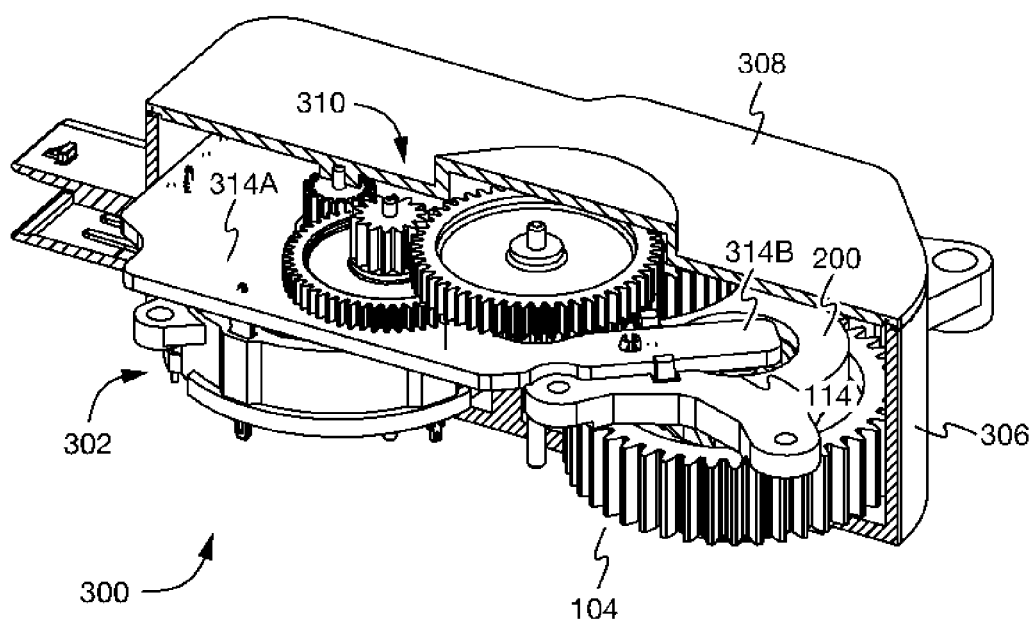

FIGS. 3a, 3b and 3c show an electric motor 300 according to an example. The electric motor 300 is shown in an exploded view in FIG. 3a, a plan view without the cover 308 in FIG. 3b and in a perspective view in FIG. 3c, wherein the housing 306 and the cover 308 are only partially shown in section.

The electric motor 300 comprises a motor unit comprising a stator 302 and a rotor 304. The electric motor 300 can be formed, for example, as a DC motor, such as a brushless DC motor (BLDC motor). The stator 302 can have a plurality of phase windings adapted to generate a time-dependent magnetic field when suitably energized, which sets the rotor 304 in motion, which can comprise one or more magnets. In other examples, the electric motor 300 can also be formed as an AC motor, for example. The electric motor 300 also comprises a housing 306 with a cover 308, in which the motor unit is arranged.

The rotor 304 is mechanically coupled to a rotatably supported element via a transmission 310, an output gear 104 in the example of FIGS. 3a to 3c. The transmission 310 translates a movement of the rotor 304 to a rotary motion of the output gear 104. The output gear 104 can be coupled, for example, to an element to be driven by the electric motor 300, such as an actuator. The output gear 104 can thus comprise an output shaft (not shown) comprising a suitable engagement profile. The output shaft can be supported, for example, in an opening (not shown) in a bottom portion of the housing 306, wherein the opening can comprise, for example, a ball bearing or a plain bearing. The opening can be sealed by a seal 312, for example to prevent leakage of lubricant from the electric motor 300 or the intrusion of dirt particles into the electric motor 300.

The electric motor 300 also comprises a guiding element, in the present example the guiding element 200 of FIG. 2a. The guiding element 200 is adapted to radially guide the gear 104 relative to a rotary axis 106, as described above, for example, with reference to FIGS. 1a, 1b. The output gear 104 can be formed, for example, in a manner similar to the output gear of FIGS. 1a, 1b. The guiding element 200 can comprise, for example, a guide 102 which engages a recess 108 on a first end face of the output gear 104 so that a contact surface 102A of the guide 102 is in contact with a bearing surface of the output gear 104. The combination with the bearing in the bottom portion of the housing 306 thus leads to the output gear 104 being guided at two opposite ends and thus ensures secure guiding.

The electric motor 300 also comprises a sensor holder adapted to receive a sensor 114 in such a way that the rotary axis 106 of the output gear 104 extends through the sensor 114 as indicated by the dotted line in FIG. 3a. The sensor 114 can be a magnetic field sensor, in particular, for example a two- or three-dimensional Hall sensor. The magnetic field sensor can be adapted to measure a magnetic field generated by the magnet 120 arranged on the output gear 104, for example to determine the position of the output gear 104 or an actuator coupled therewith. The magnet 120 can be arranged, for example, as shown in FIG. 1a, in a recess 122 on the first end face of the output gear 104.

In the example of FIG. 3a, the sensor holder is situated on a printed circuit board 314. The printed circuit board 314 has a main body 314A and a region or arm 314B extending away from the main body 314A in the direction toward the rotary axis 106. The sensor holder is on the underside, not shown in FIG. 3A, of the arm 314B and can comprise a plurality of solder lands or soldering pads to which the sensor 114 is soldered. In some examples, the sensor holder can also include further attachment elements, such as snap hooks, to hold a sensor 114 on the arm 314B. The guiding element 200 has a centering device 110, as described above, adapted to fix the printed circuit board 314 relative to the guiding element 200 and thus to the rotary axis 106. The pair of snap hooks 110B can be adapted, for example, to embrace side surfaces of the arm 314B.

The printed circuit board 314 can be, for example, the motherboard of the electric motor 300 on which a control unit (not shown) of the electric motor 300 is arranged, for example on the main body 314A. The control unit can be implemented as hardware, software or a combination thereof and can comprise, for example, a microcontroller comprising a processor and a storage medium, wherein the storage medium stores instructions executed by the processor to provide the functionality described here. The control unit can be adapted to provide and/or control drive signals for the phase windings of the stator 302. The control unit can also be adapted to determine a position of the output gear 104 or an actuator coupled therewith on the basis of a sensor signal provided by the sensor 114.

In the electric motor 300, the guiding element 200 is arranged between the output gear 104 and the sensor holder on the arm 314B of the printed circuit board 314. The output gear 104 faces the first end face 100A of the guiding element 200, while the printed circuit board 314 and thus the sensor holder face the second end face 100B of the guiding element 200. The sensor 114 and the magnet 120 can be arranged in the opening 118 of the guiding element 200 and/or near the opening 118 to achieve the smallest possible distance between sensor 114 and magnet 120. In one example, the distance between sensor 114 and magnet 120 is between 0.5 mm and 2 mm. The rotary axis 106 may extend both through the sensor 114 and through the magnet 120.

To fix the guiding element 200 between the output gear 104 and the sensor holder, the housing 306 comprises three support surfaces 316 on which the cantilever arms 200A-200C of the guiding element 200 are arranged. The support surfaces 316 are on sidewalls of the housing 306 on which the support ribs can be provided as shown in FIG. 3a, for example, which extend from the bottom portion of the housing 306 along the sidewalls and the end faces of which form the support surfaces 316.

The support surfaces 316 each have a recess or a hole arranged to align with a corresponding opening of the fixing device 116 of the guiding element to fix the guiding element 200 to the housing 306, for example by means of screws or press-fit pins. Furthermore, for positioning inside the housing 306, the centering collars 202A-202C are provided. In other examples, the support surfaces 316 can include fixing elements such as fixing noses or detent pins which can be inserted into openings of the fixing device 116. Alternatively or additionally, the cantilever arms 200A-200C can be adhesively glued or welded, for example, ultrasonically welded, to the support surfaces 316. It can also be provided that the guiding element 200 is retained by the housing 306, in particular by a housing cover, in the axial direction.

The transmission 310 can comprise a spur gear comprising a plurality of gears coupled with each other as shown in FIGS. 3a to 3c. Alternatively or additionally, the transmission 310 can also comprise a worm gear. The transmission elements of the transmission 310 can be arranged, for example, in a stepwise and/or non-parallel, non-intersecting arrangement. As shown in FIG. 3c, at least one transmission element can be arranged on a side of the printed circuit board 314 facing away from the output gear 104. The output gear 104 can be situated, for example, between the printed circuit board 314 and a bottom portion of the housing 306, while one or more gears of the transmission 310 are situated between the printed circuit board 314 and the cover 308. The printed circuit board 314 has a hole shown in FIG. 3a, in which a shaft or axle is arranged connecting a gear situated above the printed circuit board 314 with the bottom portion of the housing 306. Furthermore, at least one transmission element can be arranged in the plane of the printed circuit board 314, for example in a recess in the printed circuit board 314. In the example of FIGS. 3a to 3c, the rotor 304 is arranged below the printed circuit board 314 and coupled to the transmission 310 via a shaft extending through a hole in the printed circuit board 314. In other examples the transmission 310 can be entirely arranged on the side of the printed circuit board 314 facing the output gear 104, i.e., all of the transmission elements can be situated below the printed circuit board 314.

Figure 4A:
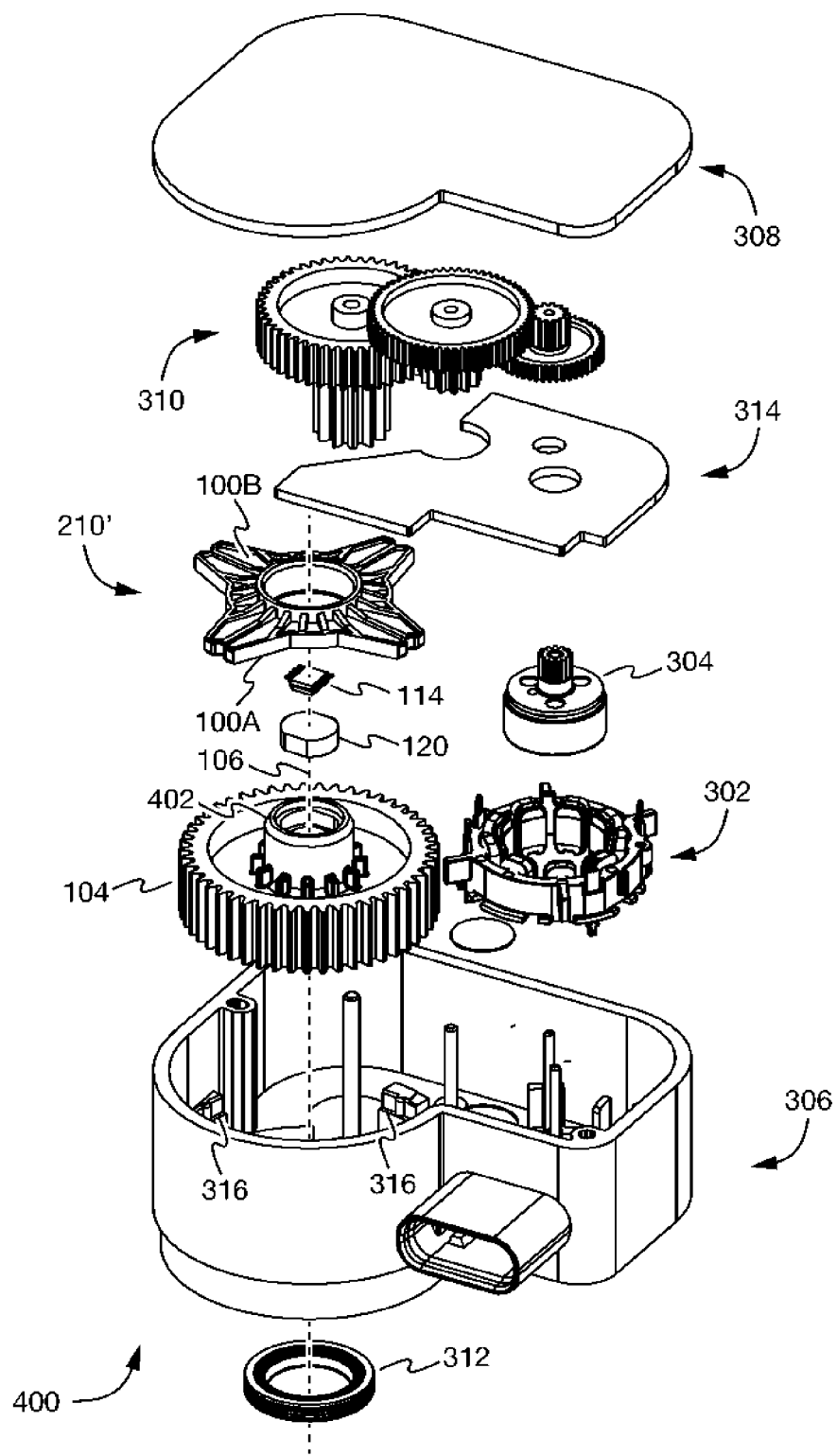
Figure 4B:
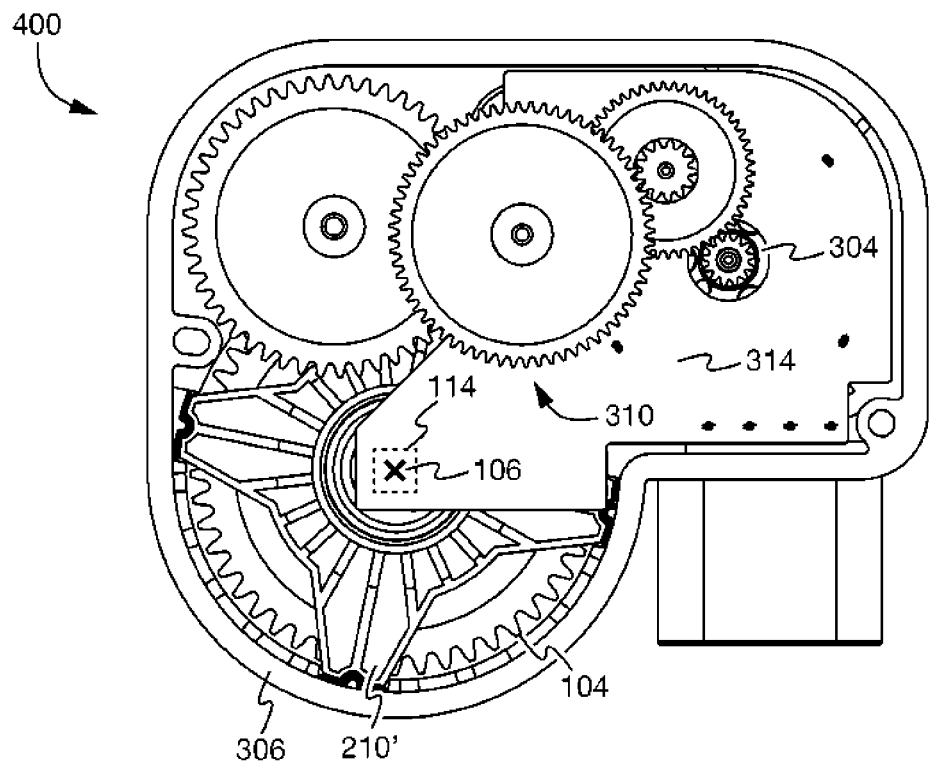
Figure 4C:
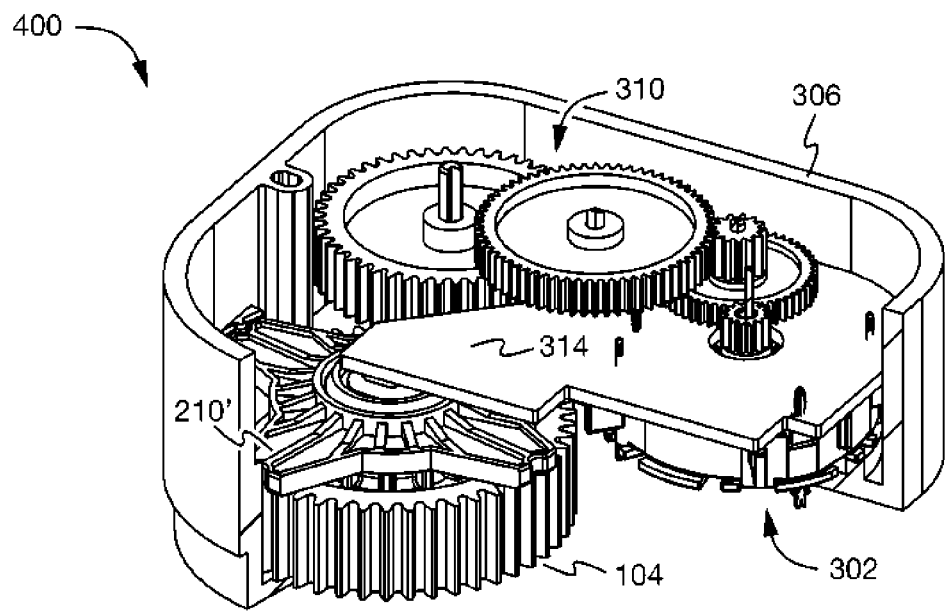

FIGS. 4a, 4b and 4c show an electric motor 400 according to a further example. Electric motor 400 is shown in FIG. 4a in an exploded view, in FIG. 4b in a plan view without the cover 308 and in FIG. 4c in a perspective view, wherein the housing 306 and the cover 308 are only partially shown in section.

The electric motor 400 is similar in structure to the electric motor 300, however has a more compact design comprising an approximately square base which is in contrast to the elongate base of the electric motor 300. The length and width of the housing 306 of the electric motor 400 can each be between 4 cm and 10 cm, for example. The electric motor 400 also comprises a rotatably supported element in the form of the output gear 104, a guiding element in the form of the guiding element 210', and a printed circuit board 314 comprising a sensor holder in order to arrange the sensor 114 on the rotary axis 106 of the output gear 104.

The guiding element 210' is similar to the guiding element 210 of FIG. 2b, however, in contrast to the latter, does not have a centering device. Due to the more compact design, the printed circuit board 314 can have sufficient stiffness, for example, to fix the sensor 114 on the rotary axis 106. In some examples, the sensor holder for the sensor 114 can be located, for example, on the main body of the printed circuit board 314, or the arm of the printed circuit board 314 can have sufficient width and thickness to suppress any movements of the sensor 114, for example, due to vibrations.

The output gear 104 has a guiding shaft 402 on its side facing the guiding element 210', the guiding shaft 402 extending from the end face of the output gear 104 along the rotary axis 106, for example into the opening 118 of the guiding element 210' or therethrough. The external surface of the guiding shaft 402 can thus be in contact with the cylindrical contact surface 102A of the guide 102 surrounding the opening 118. In an end face of the guiding shaft 402, there is a recess into which the magnet 120 is received so that it faces the sensor 114.

The housing 306 can have a plurality of support surfaces 316 on which the cantilever arms 210A-D of the guiding element 210' are supported. The support surfaces 316 can be arranged, for example, as shown in FIG. 4a on support ribs on the sidewall of the housing 306 and/or on support elements extending upwards from the bottom portion of the housing 306. The support ribs and support elements can have a plurality of protrusions or fixing noses each engaging with one of the recesses of the fixing device 116 in the cantilever arms 210A-D to fix the guiding element 210' (see FIG. 4b).

Figure 5A:
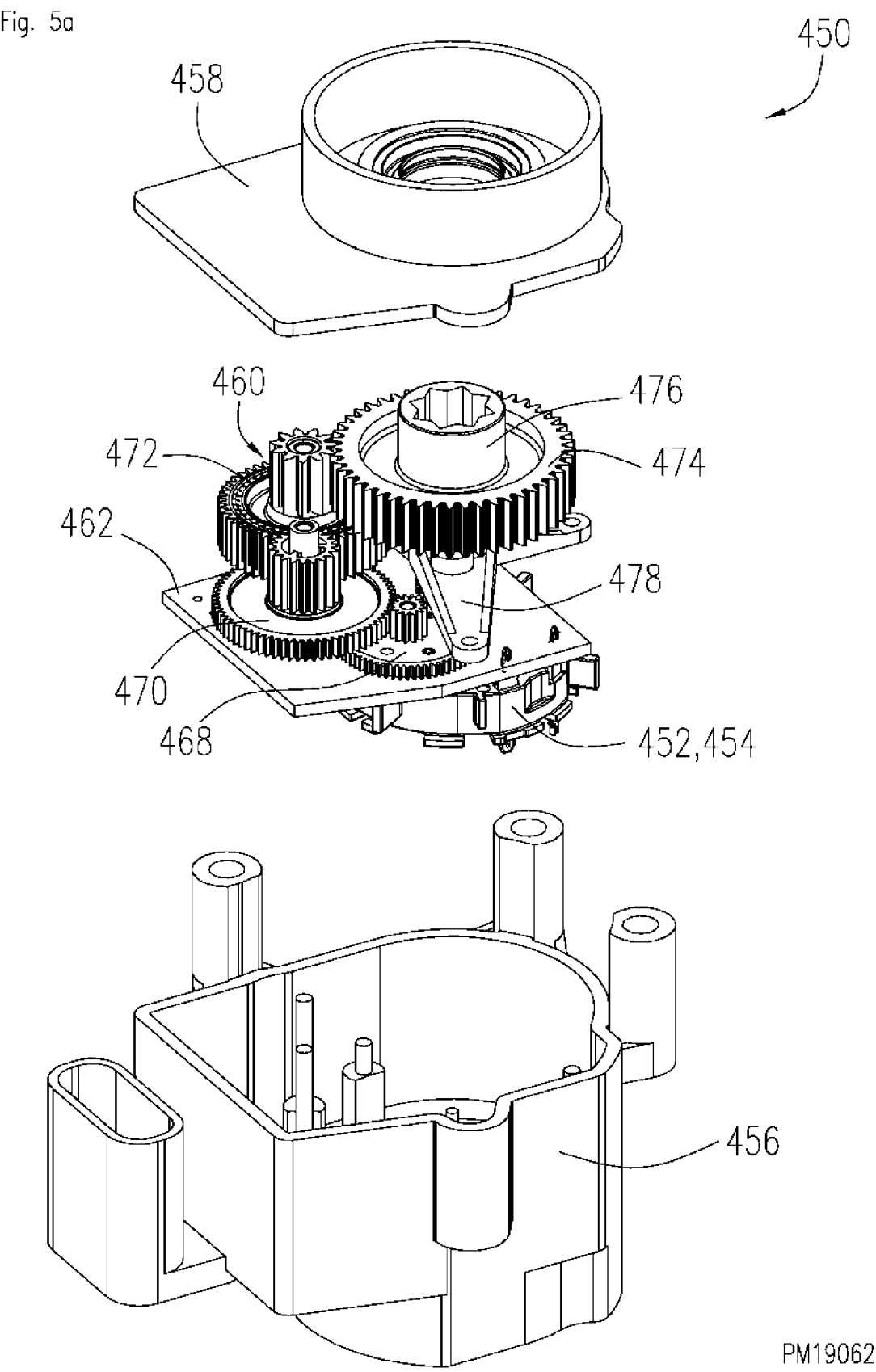
Figure 5B:
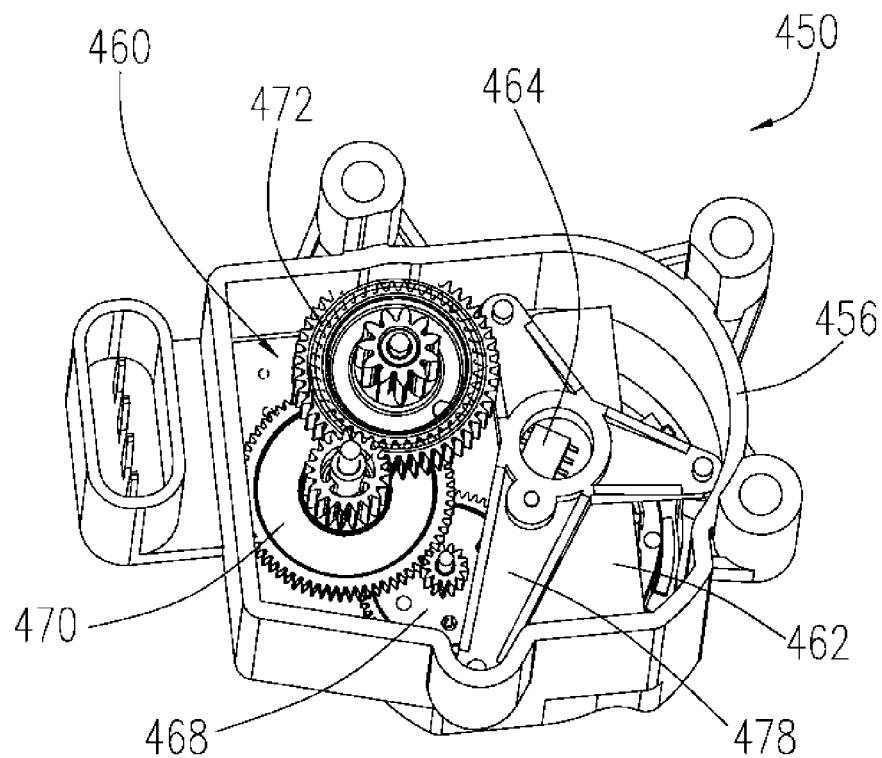
Figure 5C:
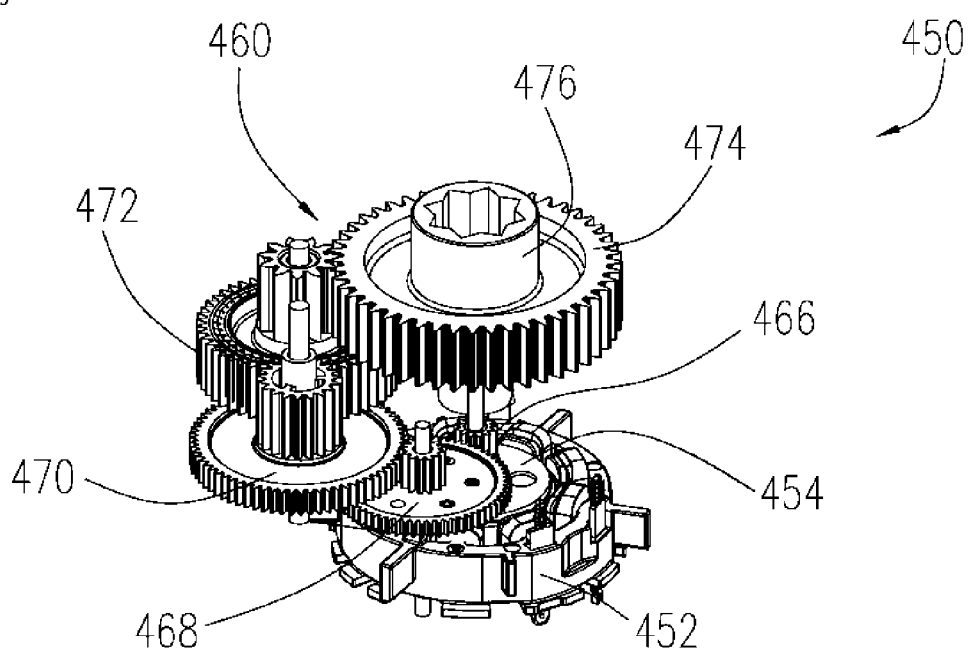

FIGS. 5a to 5c show a further example of an electric motor 450 according to an example. The electric motor 450, as a drive, comprises a three-phase brushless DC motor (BLDC motor) comprising a stator 452 and the rotor 454. The BLDC motor is arranged in a housing 456 which can be closed by a housing cover 458. Furthermore, the electric motor 450 comprises an input gear 466 which drives a transmission 460 formed as a speed reduction transmission. The BLDC motor is arranged below a printed circuit board 462. A sensor 464 formed as a Hall sensor is formed on the printed circuit board. The transmission 460 comprises intermediate gears 468, 470 and 472 arranged in a stepwise fashion, which are formed as double gears, and a rotatably supported element formed as an output gear 474. The output gear 474 is integrally formed with an output shaft formed as a hollow shaft 476. Both the intermediate gears 468-472 and the output gear 474 are arranged above the printed circuit board 462 and thus on the side of the printed circuit board 462 opposite the BLDC motor. The drive train from the input gear 466 via the intermediate gears 468, 470 and 472 up to and including the output gear 474 is thus arranged in a stepwise fashion in the manner of an ascending stair. An opening or recess, not shown, in the printed circuit board 462 can be used to couple the input gear 466 to the intermediate gear 468 to transmit the rotary motion.

Furthermore, the electric motor 450 comprises a guiding element in the form of the guiding element 478. The guiding element 478 is arranged above the printed circuit board and the sensor 464, wherein the rotary axis of the output gear 474 guided by the guiding element 478 extends through the sensor 464. Analogous to the structure of the examples shown in FIGS. 3a and 4a, a permanent magnet is arranged in the output gear 474. The guiding element 478 comprises three arms which are fixed on support points in the housing. One opening is provided in each of the distal ends of the arms, on which the guiding element 478 can be fixed by means of attachment pins or screws. The attachment pins can be fixed, for example, by means of hot caulking.

Figure 6:
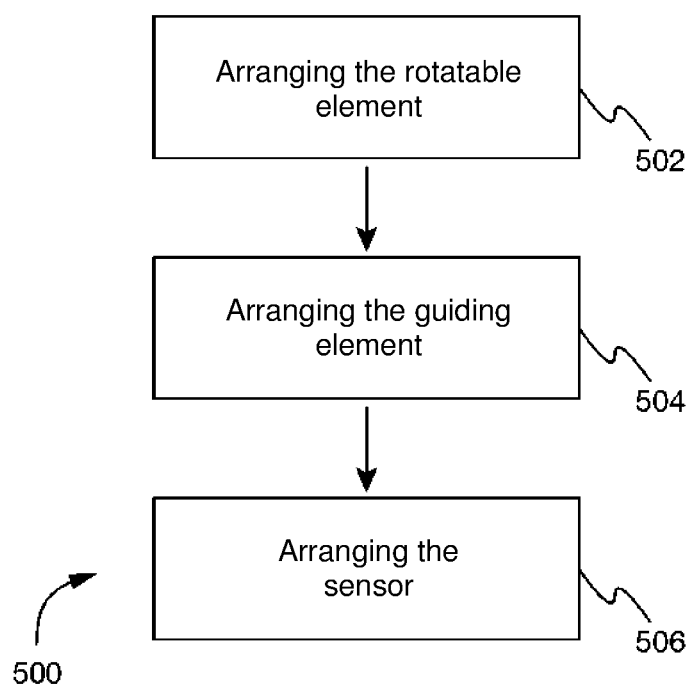

FIG. 6 shows a flow diagram of a method 500 of installing a rotatable element in an electric motor according to one example. The method will be described in the following taking the output gear 104 in the electric motor 300 as an example. However, this is by no means to be construed as a limitation. The method can also be used to install any other rotatable element in an electric motor, for example to install the gear 104 of FIG. 1a in an electric motor or to install the output gear 104 in the electric motor 400 of FIGS. 4a to 4c or in the electric motor 450 of FIGS. 5a to 5c. Moreover, the example of the method 500 is not limited to the order indicated in the flow diagram of FIG. 6. As far as technically possible, the method 500 can be carried out in any order, and steps can also be at least in part carried out simultaneously.

The method 500, in step 502, comprises arranging the output gear 104 in a bearing in the housing 306 of the electric motor 300. The bearing is adapted to rotatably support the output gear 104 about the rotary axis 106. The bearing can comprise, for example an opening in the bottom portion of the housing 306 in which the output shaft 124 of the output gear 104 is inserted, wherein the opening can comprise, for example, a plain bearing or a ball bearing. Step 502 can also comprise sealing the bearing, such as by introducing the sealing ring 312. Moreover, the output gear 104 can be mechanically coupled to the transmission 310. The output gear 104 can be provided with a magnet 120 fixed on the output gear 104. Alternatively, step 502 can comprise fixing of the magnet 120 on the output gear 104, for example by arranging the magnet 120 in the recess 122 and fixing the magnet 120, for example, by means of adhesively gluing or welding. In one example, the magnet 120 is fixed on the output gear 104 by means of an ultrasonically welded holder.

The method 500, in step 504, also comprises arranging the guiding element 200 on the side of the output gear 104 facing away from the bearing, i.e., so that the output gear 104 is situated between the guiding element 200 and the bearing. The guiding element 200 is adapted to radially guide the output gear 104 relative to the rotary axis 106 and is arranged in such a manner that the guiding element 200 is in contact with a bearing surface of the output gear 104. The guide 102 of the guiding element 200 can be inserted, for example, into the recess 108 in such a manner that the contact surface 102A is in contact with the inner circumferential surface of the recess 108, as shown in FIG. 1a. In another example, as indicated in FIG. 4a, the opening 118 of the guiding element 210' can be fitted on a guiding shaft 402 of the output gear 104 so that the contact surface 102A is in contact with the outer circumferential surface of the guiding shaft 402. The guiding element 200 may be arranged in such a manner that the magnet 120 is situated in the opening 118 or near the opening 118 of the guiding element 200.

Arranging the guiding element 200 can also comprise fixing the guiding element 200 to the housing 306. To achieve this, the cantilever arms 200A-C can be placed on the support surfaces 316 on the side walls of the housing 306 and fixed thereto, for example by adhesively gluing, screwing, hot caulking or welding. In some examples, one attachment element, such as a fixing nose, a detent pin or a press-fit pin, can be inserted in each opening of the cantilever arms 200A-C to fix the cantilever arms 200A-C.

In step 506, the sensor 114 is arranged in a sensor holder so that the rotary axis 106 of the output gear 104 extends through the sensor 114. The guiding element 200 is then situated between the sensor holder and the output gear 104. In the example of the electric motor 300, the sensor 114 can be fixed, for example on the printed circuit board 314, for example soldered to one or more solder lands on the arm 314B. The sensor 114 may be arranged in the opening 118 or near the opening 118, so that the sensor 114 is arranged facing the magnet 120.

The printed circuit board 314 can be arranged in the housing 306 of the electric motor 300 and fixed thereto, for example on one or more side surfaces of the housing 306 and/or on one or more support elements on a bottom portion of the housing 306. The sensor 114 may already be fixed on the printed circuit board prior to the installation of the printed circuit board 314 in the housing 306.

The printed circuit board 314 can be fixed relative to the guiding element 200, for example by inserting the detent pin 110A in an opening in the printed circuit board 314 and/or arranging the arm 314B between the snap hooks 110B so that the snap hooks 110B embrace side surfaces of the arm 314B.

In an example of the method 500, the gear 104 is first arranged in the bearing, then the guiding element 200 is arranged on the side of the gear 104 facing away from the bearing and subsequently the sensor 114 is arranged in the sensor holder as described before.

The method 500 can also comprise arranging the transmission 310 in the electric motor 300 so that the transmission 310 is mechanically coupled to the rotor 304 and the output gear 104. In one example, the transmission 310 is arranged in the housing 306 subsequent to the installation of the printed circuit board 314, wherein the printed circuit board 314 is installed in the housing 306, for example, subsequent to the installation of the rotor 304, the output gear 104 and the guiding element 200. In other examples, at least one transmission element of the transmission 310, in one example the entire transmission 310, is arranged in the housing 306 prior to the installation of the printed circuit board 314.

The above-described examples according to the present disclosure and the figures are given for purposes of exemplary illustration only. The invention can vary in its design without changing the basic functioning principle. The scope of protection of the method according to the present disclosure, the guiding element according to the present disclosure and the electric motor according to the present disclosure are derived solely from the following claims.

LIST OF REFERENCE NUMERALS

100—guiding element
100A—first end face
100B—second end face
102—guide
104—rotatable element
106—rotary axis
108—annular recess
110—centering device
110A—detent pin
110B—snap hook
112—sensor holding device
112A—sensor holder
114—sensor
116—fixing device
118—opening
120—magnet
122—recess
124—output shaft
200—guiding element
200A-200C—cantilever arm
202A-202C—centering collars
210, 210'—guiding element
210A-210D—cantilever arm
300—electric motor
302—stator
304—rotor
306—housing
308—cover
310—transmission
312—seal
314—printed circuit board
314A—main body of printed circuit board 314
314B—arm of printed circuit board 314
316—support surface
400—electric motor
402—guiding shaft
450—electric motor
452—stator
454—rotor
456—housing
460—transmission
462—printed circuit board
464—sensor
466—input gear
468-472—intermediate gears
474—output gear
476—hollow shaft
478—guiding element
500—method of installing a rotatable element in an electric motor
502—arranging the rotatable element
504—arranging the guiding element
506—arranging the sensor

What is claimed is:

1. A guiding element for use in an electric motor, the guiding element comprising:
    a guide for a rotatable element of the electric motor adapted to radially guide the rotatable element relative to a rotary axis;
    a centering device adapted to align and/or fix a sensor holding device in the electric motor relative to the guiding element wherein the centering device comprises a fixing element adapted to engage a counterpart on the sensor holding device to position and/or fix the sensor holding device relative to the guiding element, said fixing element includes two snap hooks to embrace a side surface of the sensor holding device and one or both of at least a detent pin to snap-engage an opening in the sensor holding device and a press-fit pin to be pressed into an opening or into a recess in the sensor holding device; and
    a fixing device adapted to fix the guiding element to a housing of the electric motor.

2. The guiding element according to claim 1, wherein the guide is arranged on a first end face of the guiding element and the centering device is arranged on a second end face of the guiding element opposite the first end face.

3. The guiding element according to claim 1, wherein the guide has a cylindrical contact surface adapted to come into contact with the rotatable element.

4. The guiding element according to claim 2, wherein the guide protrudes from the first end face of the guiding element.

5. The guiding element according to claim 2, wherein the guiding element comprises an opening extending along the rotary axis through the guiding element from the first end face to the second end face.

6. The guiding element according to claim 1, wherein the fixing device has an opening or a recess adapted to receive a fixing element to fix the guiding element to the housing of the electric motor.

7. The guiding element according to claim 1, wherein the fixing device has at least two attachment points adapted to be attached to the housing, wherein the at least two attachment points are each situated on a cantilever arm extending away from a main body of the guiding element.

8. The guiding element according to claim 1, wherein the guiding element is adapted to axially guide the rotatable element relative to the rotary axis.

9. An electric motor, comprising a rotatably supported element, a guiding element, and a sensor holding device comprising a sensor holder, wherein:
the sensor holder is adapted to receive a sensor in such a way that a rotary axis of the rotatably supported element extends through the sensor;
the guiding element is adapted to radially guide the rotatably supported element relative to the rotary axis; and
the guiding element is arranged between the rotatably supported element and the sensor holder, the rotatably supported element being situated facing a first end face of the guiding element and the sensor holder being situated facing a second end face of the guiding element, the guiding element including a centering device;
wherein the centering device comprises a fixing element adapted to engage a counterpart on the sensor holding device to position and/or fix the sensor holding device relative to the guiding element, said fixing element includes two snap hooks to embrace a side surface of the sensor holding device and one or both of at least a detent pin to snap-engage an opening in the sensor holding device and a press-fit pin to be pressed into an opening or into a recess in the sensor holding device.

10. The electric motor according to claim 9, wherein the electric motor comprises a housing and the guiding element is attached to a sidewall of the housing extending parallel to the rotary axis.

11. The electric motor according to claim 9, wherein:
the rotatably supported element has an end-side annular recess extending in the circumferential direction about the rotary axis; and
the guiding element extends parallel to the rotary axis into the annular recess and is in contact with a circumferential surface of the annular recess.

12. The electric motor according to claim 9, wherein the rotatably supported element is an output gear, which has an output shaft on the side facing away from the sensor holder, the output shaft being adapted to be mechanically coupled to an actuator.

13. The electric motor according to claim 9, wherein the sensor holding device comprises a printed circuit board, the sensor holder is arranged on the printed circuit board and the guiding element is situated between the printed circuit board and the rotatably supported element.

14. The electric motor according to claim 13, wherein the printed circuit board is a motherboard of the electric motor on which a control unit of the electric motor is arranged, which is adapted to determine a position of the rotatably supported element based on a measuring signal provided by the sensor.

15. The electric motor according to claim 13, wherein:
the sensor holder is arranged on a region of the printed circuit board extending from a main body of the printed circuit board in the direction toward the rotary axis of the rotatably supported element; and
the guiding element comprises a centering device adapted to position and/or fix the printed circuit board relative to the guiding element.

16. The electric motor according to claim 13, wherein the rotatably supported element is mechanically coupled to a rotor of the electric motor via a transmission, wherein:
at least one transmission element is arranged on a side of the printed circuit board facing away from the rotatably supported element; or
the transmission is arranged on a side of the printed circuit board facing the rotatably supported element.

17. The electric motor according to claim 9, wherein the rotatably supported element comprises a magnet and a magnetic field sensor is arranged in the sensor holder, the magnetic field sensor being adapted to measure a magnetic field generated by the magnet, wherein the magnet and the magnetic field sensor are arranged on the rotary axis so that the rotary axis extends through the magnet and the magnetic field sensor.

18. A method of installing a rotatable element in an electric motor, the method comprising:
arranging the rotatable element in a bearing in a housing of the electric motor, the bearing being adapted to support the rotatable element to be rotatable about a rotary axis;
arranging a guiding element on a side of the rotatable element facing away from the bearing, the guiding element being in contact with a bearing surface of the rotatable element and adapted to radially guide the rotatable element relative to the rotary axis; and arranging a sensor in a sensor holder of a sensor holding device so that the rotary axis of the rotatable element extends through the sensor, the guiding element being situated between the sensor holder and the rotatable element;
wherein the guiding element includes a centering device comprising a fixing element adapted to engage a counterpart on the sensor holding device to position and/or fix the sensor holding device relative to the guiding element and the fixing element includes two snap hooks to embrace a side surface of the sensor holding device and one or both of at least a detent pin to snap-engage an opening in the sensor holding device and a press-fit pin to be pressed into an opening or into a recess in the sensor holding device.

* * * * *